May 4, 1971   J. A. PORTER ET AL   3,577,332
POLAROGRAPHIC CELL
Filed July 12, 1967

JOE A. PORTER
STEUART L. COUCH
INVENTORS

ATTORNEY

United States Patent Office
3,577,332
Patented May 4, 1971

3,577,332
POLAROGRAPHIC CELL
Joe A. Porter, Whittier, and Steuart L. Couch, Santa Ana, Calif., assignors to Beckman Instruments, Inc.
Filed July 12, 1967, Ser. No. 652,745
Int. Cl. G01n 27/46
U.S. Cl. 204—195                        4 Claims

ABSTRACT OF THE DISCLOSURE

A cell for polarographic analysis of the type employing a pair of electrodes joined by an electrolyte and separated from the sample medium by a selectively permeable membrane. Pressure compensation is provided for the cell by employing an ion impermeable barrier which closes a passage leading to the eletrolyte reservoir in the cell so that contaminants outside of the cell cannot reach the electrolyte reservoir. The barrier has a sensitivity to pressure changes greater than that of the membrane so that the spacial relationship between the membrane and the sensing electrode of the cell is not influenced by changing pressure conditions.

---

Figure 1:
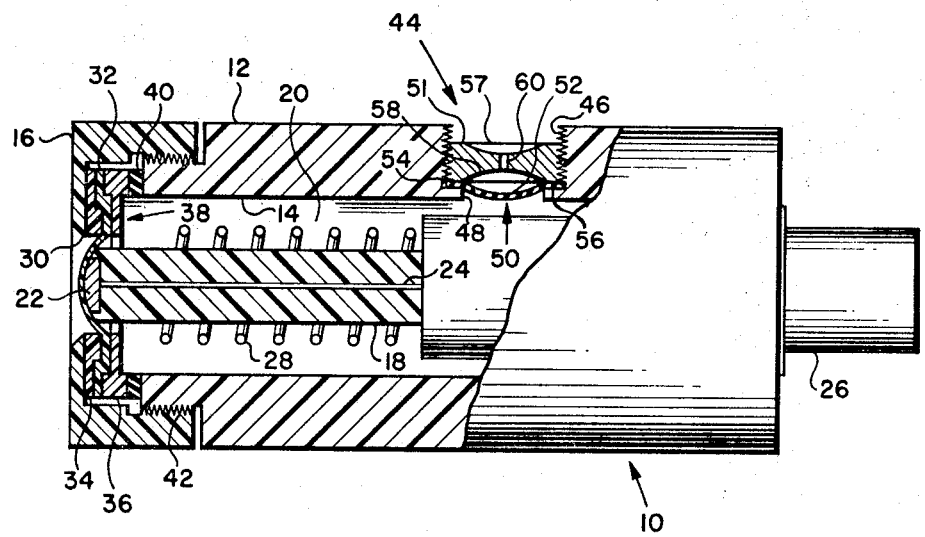

This invention relates generally to a cell for polarographic analysis of a liquid sample and, more particularly, to an improved means for providing pressure compensation for such a cell.

A number of polarographic cells are commercially available which may be used to determine the partial vapor pressure of a particular gas in a liquid or gaseous medium. For example, if it is desired to continuously ascertain the partial pressure of oxygen in a liquid or gaseous medium, a polarographic cell is provided in which an anode and cathode are separated from the liquid or gaseous medium by a thin membrane that is permeable to oxygen but impermeable to the electrolyte. In such a cell, a suitable polarizing potential is applied across the electrodes so that in the absence of the constituent in the sample that is bing measured, the cell becomes polarized so that the current which normally flows between the electrodes and the external current measuring circuit is reduced nearly to zero after a short period of time. In the presence of a constituent in the sample that is to be measured, however, the electrodes become depolarized and current flows again. The magnitude of the current between the electrodes is a function of the rate or speed at which the constituent to be analyzed passes through the membrane and of the diffusion process that takes place in the immediate vicinity of the sensing electrode of the cell adjacent to the membrane. As the constituent to be analyzed has to pass through the membrane and diffuse through a thin film of electrolyte disposed between the membrane and the sensing electrode, the spacial relationship between the membrane that is permeable to the constituent and the electrode is extremely important.

Although cells of the above-mentioned type have given accurate performance for many practical situations, it has been found that occasionally a shift in calibration of a reading of the cells and in the response of the output of the cells results from changes in the pressure of the medium being tested causing a change in the spacial relationship between the sensing electrode and the membrane. It has been the conventional practice in order to overcome such effect by providing a passage in the cell communicating between the electrolyte reservoir and the test medium so that there is provided equal pressure on opposite sides of the membrane adjacent to the sensing electrode. This form of pressure compensation is generally satisfactory except for the fact that the passage in the cell wall providing pressure compensation results in electrolyte leakage from the cell or contamination of the electrolyte when the sample being analyzed is a liquid which permeates into the electrolyte of the cell via the pressure compensation passage.

It is, therefore, the principal object of the present invention to provide an improved pressure compensation means for a polarographic cell.

According to the principal aspect of the present invention, a movable impermeable barrier is provided which closes the pressure compensation passage normally provided in a polarographic cell whereby the loss of electrolyte through the passage as well as contamination of electrolyte from external fluid is prevented. The barrier is constructed so that it has a sensitivity to pressure changes greater than that of the membrane covering the sensing electrode so that forces resulting from changes of pressure in the sample medium function to displace the barrier rather than the membrane covering the sensing electrode so that the spacial relationship between the membrane and sensing electrode is not altered. Accordingly, there is provided a pressure compensating means which eliminates leakage between the cell reservoir and sample medium yet does not affect the response and other operating characteristics of the polarographic cell.

Figure 2:
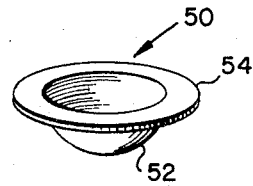

Other objects, aspects and advantages will become more apparent from the following description taken in connection with the accompanying drawing wherein:

FIG. 1 is a partial cross-sectional view of a polarographic cell incorporating the pressure compensating device of the present invention; and FIG. 2 is an enlarged perspective view of the ion impermeable barrier employed in the cell illustrated in FIG. 1.

Referring now to the drawing in detail, there is illustrated a polarographic cell, generally designated by numeral 10, comprising a cylindrical plastic body 12 having a cylindrical recess 14 in one end thereof. The recess is closed by a cap 16 which is screw threaded upon the body. The body 12 includes a central plastic element 18 which is spaced from the walls of the recess 14 to provide an electrolyte reservoir 20. The end of the element 18 terminates adjacent the cap 16 and has mounted therein an electrode disk 22 which is flush with the end of the element 18. A conductor 24 extending lengthwise through the element 18 of the body connects the electrode 22 to a conducting terminal 26. The second electrode 28 of the cell is in the form of a helical wire positioned within the reservoir 20 having one end connected to the terminal 26. The terminal 26 includes appropriate electrical connections, not shown, for connecting the cell to an external circuit.

The cap 16 has a central opening 30 therein aligned with the electrode 22. A membrane 32 which is permeable to the constituent being measured and substantially impermeable to electrolyte, such as polyethylene or Teflon, is clamped between a pair of disks 34 and 36 of a membrane holder assembly 38. A rubber annular seal 40 is positioned between the disk 36 and the end of the body 12. The membrane holder assembly 38 is positioned between the front face of the seal 40 and the cap 16 so that upon tightly screwing the cap upon the threaded end 42 of the body, the membrane is tightly stretched over the end of the element 18 and the electrode 22 to provide therebetween a thin electrolyte film space which is in communication with the electrolyte reservoir 20. For a more detailed description of the membrane holder assembly 38, reference is made to copending patent application of Porter et al. entitled "Electrochemical Cell," Ser. No. 590,900, filed Oct. 31, 1966 and assigned to the assignee of the present application.

When the cell 10 is used for the polarographic measurement of oxygen, the electrode 22 may be formed of gold or other noble metal, the electrode 28 may be formed of silver and the electrolyte is then suitably a potassium chloride solution. As well known in the art, a suitable polarizing potential is impressed across the electrodes from an external circuit, not shown, so that when oxygen diffuses through the membrane 32 into the electrolyte film space adjacent to the electrode 22, the oxygen is reduced at the electrode thereby producing a current which is an indication of the partial pressure of oxygen in the sample medium being analyzed. Also, as is well known in the art, the external voltage source may be eliminated if the electrodes are formed of materials which produce an electrical voltage potential therebetween of proper magnitude. For example, the electrode 22 may be formed of gold, silver or other noble metal and the electrode 28 of zinc, cadmium or lead and the electrolyte may be potassium hydroxide solution.

In accordance with the present invention, there is provided an improved means for providing pressure compensation for the cell 10, generally designated by numeral 44. The pressure compensating means includes a threaded bore 46 which opens through the outer surface of the body 12 and a passage 48 of smaller cross-section than the bore 46 communicating between the base of the bore and the reservoir 20. An ion impermeable barrier 50 is provided which is formed of an elastomeric material, such as natural rubber or Viton—a fluorocarbon rubber. The barrier includes a cup-shaped portion 52 and an annular flange 54. An insert 51, when threaded into the bore 46, clamps the flange 54 of the barrier between the end of the insert and an annular shoulder 56 in the body 12 thereby closing the passage 48. The outer end of the insert has a slot 57 to receive the end of a screw driver or other suitable tool to facilitate threading of the insert into the bore 46. The inner end of the insert 51 has a generally semi-hemispherical cavity 58. A passage 60 extends through the insert 51 and opens at the cavity 58. It can be appreciated that when the pressure within the cell is greater than that outside the cell, the barrier 50 moves outwardly into the cavity 58 whereas when the pressure outside the cell is greater than that inside the cell, the elastomeric barrier expands inwardly toward the reservoir 20.

It is an important feature of the invention that the barrier 50 be more sensitive to pressure changes than the membrane 32 so that changes in the pressure of the sample medium will affect only the barrier 50, thereby providing pressure compensation between the inside of the cell 10 and the sample medium yet without altering the spacial relationship between the membrane 32 and the electrode 22. Several features are provided in the pressure compensating device 44 to cause the barrier 50 to be more sensitive to pressure changes than the membrane 32. One of these features is the provision of the exposed area of barrier 50 being substantially greater than the unsupported annular area of membrane 32, that is, the annular portion of membrane 32 lying between the openings in annular disks 34 and 36 and the surface of the central element 18. Consequently, pressure fluctuations in the sample medium will effect a much greater force against the barrier 50 than the unsupported annular area of the membrane 32.

Another feature of the pressure compensating device 44 which provides for the barrier 50 being more sensitive to pressure changes than the membrane 32 is the fact that the cup-shaped portion 52 of the barrier is free from tension and, therefore, readily subject to movement due to pressure fluctuations as compared to the membrane 32 which is tightly stretched over the electrode 22. Obviously any other form of flexible bulbous barrier, which is not drawn under tension, could be employed. Finally, since natural rubber is a substantially softer and more resilient material than Teflon or polyethylene which are normally used as the membrane in a polarographic cell, the barrier 50 is more subject to pressure changes than the membrane 32.

From the above description, it can be appreciated that there is provided by the present invention an improved pressure compensating device for a polarographic cell which prevents the escape of electrolyte from the cell and contamination of the electrolyte by the sample while permitting effective pressure compensation without altering the spacial relationship between the membrane 32 and electrode 22.

Although only a single embodiment of the invention has been disclosed herein for purposes of illustration, it will be understood that various changes can be made in the form, details, arrangement and proportions of the various parts in such embodiment without departing from the spirit and the scope of the invention as defined by the appended claims.

What is claimed is:

1. A cell for electrochemical analysis of a constituent in a sample comprising a body having an electrolyte reservoir therein, a pair of spaced electrodes positioned in said reservoir and adapted to be joined by an electrolyte in said reservoir, an opening communicating between said reservoir and the exterior of said body, a thin, flexible polymeric membrane permeable to said constituent and impermeable to electrolyte, means mountnig said membrane under tension over one of said electrodes and in a position to close said opening, and a passage in said body communicating between said reservoir and the exterior of said body wherein the improvement comprises:

movable ion impermeable barrier means separating said electrolyte reservoir from said passage and having a sensitivity to pressure changes greater than that of said membrane;
a bore extending through the wall of said body, said bore including a first threaded section opening at the outer surface of said body and a second section of of a diameter less than that of said first section opening into said reservoir;
an annular shoulder formed between said first and second sections of said bore;
an insert threaded in said first section of said bore, said passage extending through said insert and having a diameter less than that of said second bore section;
the inner surface of said insert having a cavity formed therein, said passage opening into said cavity;
said barrier means being formed of a flexible material; and
said barrier means closing said second bore section and embodying a cup-shaped portion extending into said second section, said barrier means including an annular flange clamped between said shoulder and the outer edge of said insert.

2. A cell as set forth in claim 1 wherein the exposed area of said barrier means is substantially greater than the unsupported area of said membrane.

3. A cell as set forth in claim 2 wherein said barrier means has greater resiliency than said membrane.

4. A cell as set forth in claim 1 wherein said barrier means is formed of rubber.

References Cited

UNITED STATES PATENTS

| | | | |
|---|---|---|---|
| 2,595,042 | 4/1952 | Willie | 204—195 |
| 2,930,967 | 3/1960 | Laird et al. | 204—195 |
| 2,986,511 | 5/1961 | Digby | 204—195.1 |
| 3,070,539 | 12/1962 | Arthur et al. | 204—195 |
| 3,410,778 | 11/1968 | Krasberg | 204—195 |
| 3,410,779 | 11/1968 | Whitehead et al. | 204—195 |
| 3,278,408 | 10/1966 | Leonard et al. | 204—195 |
| 3,503,861 | 3/1970 | Volpe | 204—195 |

TA-HSUING TUNG, Primary Examiner